(12) United States Patent
Asanin et al.

(10) Patent No.: US 12,716,435 B2
(45) Date of Patent: Aug. 25, 2026

(54) BODY ASSEMBLY WITH A GUIDE ELEMENT FOR REDIRECTING A GAS FLOW EMERGING FROM AN ENERGY STORAGE HOUSING

(71) Applicant: Bayerische Motoren Werke Aktiengesellschaft, Munich (DE)

(72) Inventors: Savo Asanin, Munich (DE); Robert Forster, Pfaffenhofen (DE); Benjamin Koch, Weilheim (DE); Jan Mueller-Brincken, Munich (DE); Tobias Preuss, Munich (DE); Constantin Ferdinand Roesler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 289 days.

(21) Appl. No.: 18/562,406

(22) PCT Filed: May 17, 2022

(86) PCT No.: PCT/EP2022/063278
§ 371 (c)(1),
(2) Date: Nov. 20, 2023

(87) PCT Pub. No.: WO2022/243290
PCT Pub. Date: Nov. 24, 2022

(65) Prior Publication Data

US 2024/0247667 A1 Jul. 25, 2024

(30) Foreign Application Priority Data

May 21, 2021 (DE) .................. 10 2021 113 3246.6

(51) Int. Cl.
*F15D 1/00* (2006.01)
*B60K 1/04* (2019.01)
*H01M 50/375* (2021.01)

(52) U.S. Cl.
CPC .............. *F15D 1/0005* (2013.01); *B60K 1/04* (2013.01); *H01M 50/375* (2021.01); *B60K 2001/0438* (2013.01)

(58) Field of Classification Search
CPC .................... F15D 1/0005; B60K 1/04; B60K 2001/0438; H01M 50/375; H01M 10/61;
(Continued)

(56) References Cited

U.S. PATENT DOCUMENTS 8,663,824 B1 3/2014 Frey et al.
2011/0174556 A1 7/2011 Hermann et al.
(Continued)

FOREIGN PATENT DOCUMENTS

DE 10 2013 204 585 A1 9/2014
DE 10 2017 212 223 A1 1/2019
(Continued)

OTHER PUBLICATIONS

International Search Report (PCT/ISA/210) issued in PCT Application No. PCT/EP2022/063278 dated Sep. 12, 2022 with English translation (6 pages).
(Continued)

*Primary Examiner* — Brodie J Follman
(74) *Attorney, Agent, or Firm* — Crowell & Moring LLP

(57) ABSTRACT

A body assembly has a vehicle structural element configured to mechanically couple to an energy storage housing. At least one guide element redirects a gas flow emerging from at least one exit port of the energy storage housing. The at least one exit port is configured to pass gas from within the
(Continued)

energy storage housing to an external environment external to the energy storage housing.

12 Claims, 1 Drawing Sheet

(58) Field of Classification Search
CPC ........... H01M 10/625; H01M 10/6566; H01M 50/249; H01M 50/35; H01M 50/383; H01M 2220/20; A62C 3/16; A62C 3/07; B60Y 2410/114
See application file for complete search history.

(56) References Cited

U.S. PATENT DOCUMENTS

2012/0237803 A1 9/2012 Mardall et al.
2016/0099451 A1* 4/2016 Murai et al. ........ H01M 50/317
2020/0112006 A1 4/2020 Ernst
2020/0235359 A1 7/2020 Hayashi et al.
2020/0365859 A1 11/2020 Hoefner
2020/0373525 A1 11/2020 Pfeiff
2022/0393298 A1* 12/2022 Shin et al. ............ H01M 50/35

FOREIGN PATENT DOCUMENTS

DE 10 2019 207 347 A1 11/2020
FR 3 095 897 A1 11/2020
JP 2017-50055 A 3/2017
WO WO 2018/153564 A1 8/2018

OTHER PUBLICATIONS

German-language Written Opinion (PCT/ISA/237) issued in PCT Application No. PCT/EP2022/063278 dated Sep. 12, 2022 with English translation (11 pages).
German-language Office Action issued in German Application No. 10 2021 113 324.6 dated Apr. 8, 2022 (6 pages).

* cited by examiner

BODY ASSEMBLY WITH A GUIDE ELEMENT FOR REDIRECTING A GAS FLOW EMERGING FROM AN ENERGY STORAGE HOUSING

BACKGROUND AND SUMMARY

The invention relates to a body arrangement having a vehicle structural element which is constructed for mechanical coupling to an energy storage housing.

The cells of a battery store in vehicles can discharge gas as a result of damage, malfunctions or other causes. This gas flow is directed outward from battery stores via defined openings with valves in the battery housing.

Such systems attempt to influence the gas flow or flame development via components on the battery housing. From documents U.S. Pat. No. 8,663,824 B1, US 2011/0174556 A1 and US 2020/0235359 A1, for example, battery pack housings which have gas outlet openings for discharging hot gas from inside the battery pack housing are known. The gas outlet openings and the outlet nozzles of the battery pack housing which are arranged thereon may, however, be exposed to high thermal loads so that these components may become disengaged. Furthermore, depending on the positioning of the openings, the gas flow may strike vehicle components. The gas flow may also ignite. Consequently, these vehicle components may become damaged or ignite. Consequently, occupants must leave the vehicle before the interior becomes endangered. Other solutions provide a passive protection in which the region which is subjected to gas or flames is thickened by means of additional components in order to thus increase the resistance with respect to the action. However, the known measures can provide only a localized, point-like protection. A doubling of relatively large gas or flame-affected regions would necessarily lead to an increase in costs and weight.

An object of the invention is to improve a body arrangement mentioned in the introduction structurally and/or functionally.

The object is achieved with a body arrangement having the features of the independent claims. Advantageous embodiments and/or further developments are set out in the dependent claims.

A body arrangement may have a vehicle structural element. The vehicle structural element may be constructed for mechanical coupling to an energy storage housing. The body arrangement may have at least one guide element for redirecting a gas flow being discharged from at least one outlet opening of the energy storage housing. The at least one guide element may be a gas guiding element, such as a gas guiding metal sheet. The at least one guide element may be used for heat protection and/or flame protection of the vehicle structural element and/or vehicle and/or be constructed and/or arranged for this purpose.

The at least one outlet opening of the energy storage housing can be configured to allow through gas from the interior of the energy storage housing to an external environment located outside the energy storage housing. The energy storage housing may have a plurality of, such as two, three or more outlet openings. The at least one guide element may be constructed and/or arranged to redirect a plurality of gas flows being discharged from a plurality of outlet openings of the energy storage housing.

The redirection may also be a diversion or guiding, such as guiding away. The at least one guide element may be constructed and/or arranged to redirect at least one gas flow in a predetermined or defined direction. The at least one guide element may be constructed and/or arranged to guide the gas flow being discharged from the at least one outlet opening of the energy storage housing to a region which is non-critical, for example, with regard to passenger safety.

The energy storage housing may have at least one valve or nozzle. The at least one valve or nozzle may be constructed to close and/or open the at least one outlet opening. The at least one valve or nozzle may be a one-way valve or one-way nozzle. The at least one valve or nozzle may be constructed in such a manner that, during normal operation, the at least one valve or nozzle or the at least one outlet opening is closed and/or, when a predetermined temperature and/or pressure is/are exceeded, the at least one valve or nozzle or the at least one outlet opening is open so that gas from the interior of the energy storage housing is allowed through to the external environment outside the energy storage housing.

The body arrangement may have the energy storage housing. The energy storage housing may be securely connected to the vehicle structural element, in particular screwed, riveted or welded. The energy storage housing and/or the vehicle structural element may have securing means and/or securing portions for securing or connecting together the energy storage housing and the vehicle structural element. The energy storage housing may be arranged below the vehicle structural element. The shape, in particular external shape, of the energy storage housing may be constructed to be at least partially adapted and/or complementary to at least a portion of the vehicle structural element. The energy storage housing may be a battery housing or battery pack housing. The energy storage housing may be constructed to receive at least one or a large number of, such as two, three or more energy storage device(s). The energy storage device may be a battery, accumulator and/or high-voltage store. The energy storage device(s) may be used to supply an electric motor, in particular an electric drive motor of a vehicle. The electric motor may be arranged on the vehicle structural element and/or securely connected thereto, for instance, screwed, riveted or welded. The vehicle may be an electric vehicle or hybrid vehicle. The vehicle may be a motor vehicle, such as a passenger vehicle or a truck.

The at least one guide element may be constructed in such a manner that the gas flow, which is discharged in particular from the at least one outlet opening of the energy storage housing, is substantially compressed and/or swirled, for example, between the at least one outlet opening and the guide element. The at least one guide element may be arranged on the vehicle structural element in such a manner that the gas flow being discharged in particular from the at least one outlet opening of the energy storage housing is substantially compressed and/or swirled, for example, between the at least one outlet opening and the guide element.

The at least one guide element may be constructed in such a manner that the gas flow which is discharged in particular from the at least one outlet opening of the energy storage housing is distributed or guided substantially in the direction of the width of the vehicle structural element and/or vehicle and/or is changed into a substantially diffuse gas flow. The at least one guide element may be arranged on the vehicle structural element in such a manner that the gas flow which is discharged in particular from the at least one outlet opening of the energy storage housing is distributed or guided substantially in the direction of the width of the vehicle structural element and/or vehicle and/or transferred into a substantially diffuse gas flow. The at least one guide element and/or the energy storage housing may be constructed and/or arranged on the vehicle structural element in such a manner that the gas flow during discharge from an intermediate space between the guide element and energy storage housing is diffuse and/or the gas flow is distributed over the width of the vehicle structural element and/or vehicle.

The at least one guide element may extend substantially in the direction of the width of the vehicle structural element and/or vehicle. The at least one guide element may be arranged in the direct vicinity of the at least one outlet opening of the energy storage housing on the vehicle structural element. The at least one guide element may be arranged opposite the at least one outlet opening of the energy storage housing on the vehicle structural element. The at least one guide element may be a guiding metal sheet and/or angular metal sheet. The at least one guide element may be constructed to be substantially U-shaped and/or V-shaped and/or angular in cross section. The at least one guide element may be a bent or pressed member. The at least one guide element may be produced from a temperature-resistant material. The temperature-resistant material may be, for example, metal, such as steel, ceramic material and/or composite material, such as a fiber composite material.

The at least one guide element may be arranged on the vehicle structural element. The at least one guide element may be arranged below the vehicle structural element. The at least one guide element may be securely connected to the vehicle structural element, in particular screwed, riveted or welded.

The vehicle structural element may be a vehicle body and/or a body component, such as a metal base sheet and/or carrier, of a vehicle body. The metal base sheet may be a vehicle base or a metal vehicle base sheet. The carrier may be a front axle carrier or rear axle carrier. The vehicle structural element may be a body structure, such as a vehicle body structure. The vehicle structural element may be used for separation between the energy storage housing and an interior space, such as the vehicle interior, of the vehicle, or may be constructed and/or arranged for this purpose.

The body arrangement may be constructed for arrangement in a vehicle. A vehicle, such as a motor vehicle, may have a body arrangement. The body arrangement may be constructed as described above and/or below. The vehicle may be an electric vehicle or hybrid vehicle. The vehicle may be a motor vehicle, such as a passenger vehicle or heavy goods vehicle.

In summary and in other words, consequently, as a result of the invention there is produced inter alia a guide element, such as a guiding metal sheet, for thermal protection of a vehicle in battery vehicles. A battery housing may have an opening. A gas flow may be discharged from the opening. The gas flow being discharged from the opening in the battery housing may be redirected or diverted using a component, such as a guide element and/or guiding metal sheet. The gas flow can consequently be directed to more non-critical regions with respect to the passenger safety. The flow which is directed to the greatest possible extent during discharge from the battery housing can be converted by the component into a more diffuse flow. A localized thermal loading or flame impingement of vehicle components can be avoided. The components can be acted on in a more uniform manner. The ignition can thereby be avoided and/or the service-life with respect to the thermal loading can be increased. The risk to safety in the interior of the vehicle can be temporally delayed or avoided completely. The component may be or become positioned in such a manner that it is located in the direct vicinity of the outlet opening. Consequently, only the component may be exposed to the directed gas flow and the resultant high temperature peaks.

The component may be produced from a correspondingly thermally resistant material. A thermally resistant material may be a metal, such as steel. A rear support may be provided by means of at least one other component which ensures the dimensional stability of the directly affected component. The component may be produced from a non-dimensionally stable but temperature-resistant material, such as a fiber composite material.

A vehicle may have an interior which is intended to be protected for the passengers and a battery housing. The separation between the interior and battery housing may be carried out by means of a metal base sheet of the body structure. The battery storage housing may have openings having valves for discharging the gases. In the state without a guide element or guiding metal sheet, the gas flow or flames can strike the metal base sheet and components, for example, a rear axle carrier with an electric motor, in a virtually unimpeded and directed manner. As a result of the guiding metal sheet, the gas flow between the outlet opening and guiding metal sheet can be blocked. On the one hand, a swirling of the gases may thereby be produced and, on the other hand, the gases, depending on the embodiment of the battery housing and/or guiding metal sheet, for example, air guiding metal sheet, can be distributed in the direction of the vehicle width. During discharge from the intermediate space of the guiding metal sheet and battery housing, the flow may be distributed in a diffuse manner and/or over the vehicle width. The metal base sheet and/or the components in the vehicle can thereby be less highly thermally loaded.

With the invention, a damage or ignition of vehicle components can be avoided or at least temporally delayed. Protection over large regions can be provided. A localized thermal loading or ignition of vehicle components can be avoided. The gas flow or the flames no longer strike vehicle components in an unimpeded and directed manner. A more uniform impact on the vehicle components can be achieved. An ignition can be avoided and the service-life with respect to thermal loading can be increased. The risk to safety inside the vehicle can be completely avoided or at least temporally delayed. The passenger safety can be increased. Costs and weight can be saved.

Exemplary embodiments of the invention are described in greater detail below with reference to the Figures.

DETAILED DESCRIPTION OF THE DRAWINGS

Figure 1:
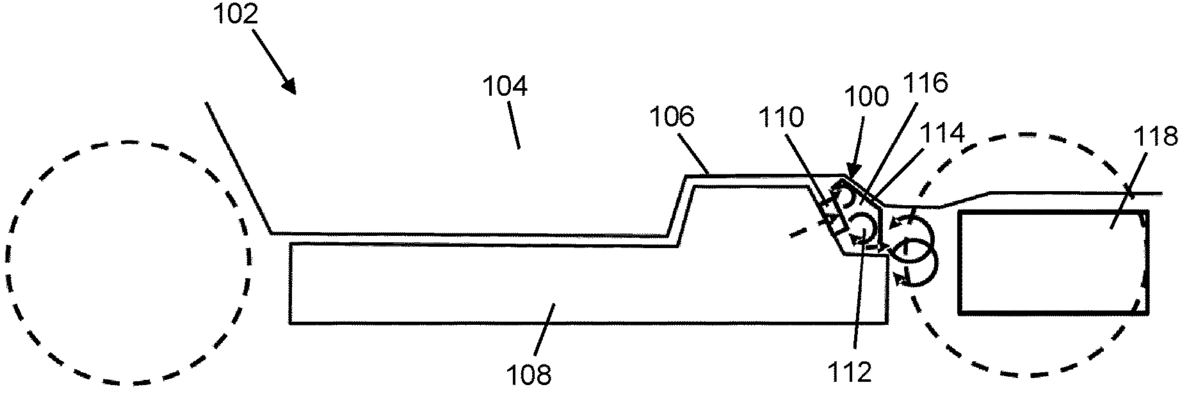
FIG. 1 is a schematic side view of a body arrangement of a vehicle.
Figure 2:
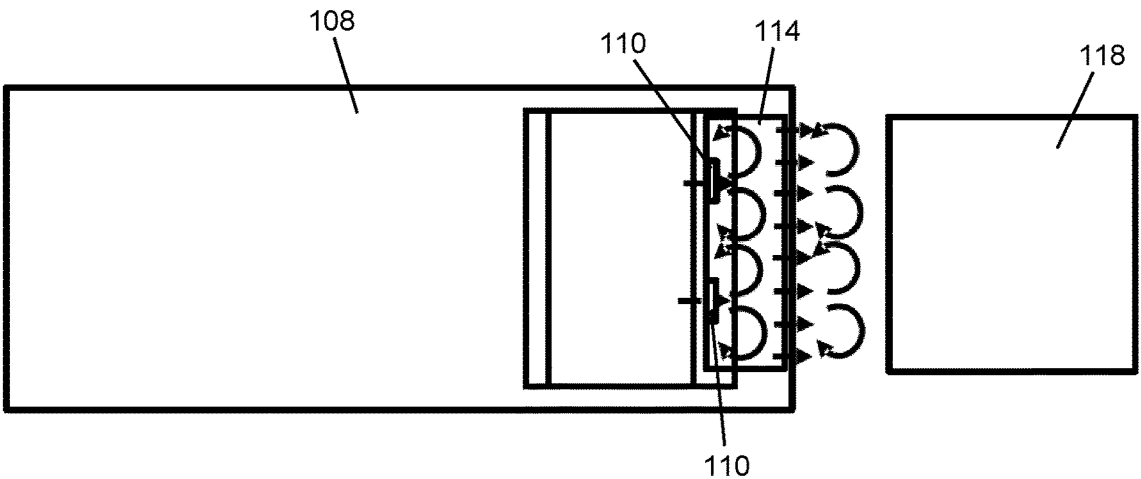
FIG. 2 is a schematic detail of the body arrangement having an energy storage housing as a plan view.

FIG. 1 shows a schematic side view of a body arrangement 100 of a vehicle 102, and FIG. 2 shows a detail of the body arrangement 100 as a plan view.

The vehicle 102 has an interior 104, which is intended to be protected, for passengers. The body arrangement 100 has a vehicle structural element 106 and an energy storage housing 108. The energy storage housing 108 is arranged below the vehicle structural element 106 and is mechanically coupled to the vehicle structural element 106 by means of screwing. The vehicle structural element 106 is in the form of a metal vehicle base sheet of a vehicle body and acts as a partition between the vehicle interior 104 and the energy storage housing 108. The energy storage housing has at least one energy storage device, such as a battery, and at least one outlet opening 110. The at least one outlet opening 110 has a valve and is constructed to allow through gas or a gas flow (schematically indicated by the arrows) from the interior of the energy storage housing 108 to an external environment 112 outside the energy storage housing 108. In the present exemplary embodiment, the energy storage housing 108 has two outlet openings 110 (cf. FIG. 2).

The body arrangement 100 further has at least one guide element 114 for diverting the gas flow (schematically indicated by the arrows) being discharged from the outlet openings 110 of the energy storage housing 108. The at least one guide element 114 is arranged in the direct vicinity and opposite the outlet openings 112 of the energy storage housing 108 on the vehicle structural element 106. The at least one guide element 114 is arranged below the vehicle structural element and securely connected thereto, in particular screwed, riveted or welded.

The at least one guide element 114 is constructed in such a manner and arranged on the vehicle structural element 106 in such a manner that the gas flow being discharged in the intermediate space 116 between the guide element 114 and the energy storage housing 108 is substantially compressed and swirled. The at least one guide element 114 is further constructed in such a manner and arranged on the vehicle structural element 106 in such a manner that the gas flow being discharged is distributed in the direction of the width of the vehicle structural element 106 and vehicle 102, and during discharge from the intermediate space 116 is substantially diffuse.

The at least one guide element 114 is in the form of a guiding metal sheet and has in cross section, as illustrated in FIG. 1, a substantially angular U-shape. The open side of the angular U-shaped guiding metal sheet faces in the direction of the outlet openings 110 of the energy storage housing 108. As can be seen in FIG. 2, the at least one guide element 114 extends substantially in the direction of the width of the vehicle structural element 106 or vehicle 102. The at least one guide element 114 is further produced from a temperature-resistant material, for example, metal, such as steel, ceramic material and/or composite material, such as fiber composite material.

As a result of the guide element 114 which is arranged so as to act on the vehicle structural element 106, the gas flow between the outlet openings 110 and the guide element 114 is blocked. On the one hand, a swirling of the gas flow is thereby produced and, on the other hand, the gas flow is distributed in the direction of the vehicle width. During discharge from the intermediate space 116 of the guide element 114 and energy storage housing 108 the gas flow has then been changed into a diffuse flow and distributed over the vehicle width. The gas flow and/or the flames consequently no longer strike the vehicle structural element 106 and other vehicle components, such as, for example, the rear axle carrier with electric motor 118, in an unimpeded and directed manner. The vehicle structural element 106 and the other vehicle components of the vehicle 102 are thus no longer subjected to a thermal stress or load, or at least to a lesser extent.

The term "can" is used in particular to refer to optional features of the invention. Consequently, there are also further developments and/or exemplary embodiments of the invention which additionally or alternatively have the respective feature or the respective features.

From the combinations of features disclosed here, where necessary isolated features may also be taken out and, with a structural and/or functional relationship which may exist between the features being broken up, be used in combination with other features in order to delimit the subject-matter of the claims. The sequence and/or number of steps of the method may be varied.

LIST OF REFERENCE NUMERALS

100 Body arrangement
102 Vehicle
104 Vehicle interior
106 Vehicle structural element
108 Energy storage housing
110 Outlet opening
112 External environment
114 Guide element
116 Intermediate space
118 Electric motor

The invention claimed is:

1. A body arrangement, comprising:

a vehicle structural element which is configured for mechanical coupling to an energy storage housing; and at least one guide element for redirecting a gas flow discharged from at least one outlet opening of the energy storage housing, the at least one guide element being mounted on the vehicular structural element, wherein the at least one outlet opening is configured to allow through gas from an interior of the energy storage housing to an external environment located outside the energy storage housing, and the at least one guide element is constructed with a cross section in a longitudinal direction of the vehicle having an open end arranged opposite the at least one outlet opening of the energy storage housing such that the gas flow discharged from the interior of the energy storage housing is substantially compressed and/or swirled between the at least one outlet opening and the at least one guide element.

2. The body arrangement according to claim 1, wherein the at least one guide element is constructed such that, and/or arranged on the vehicle structural element such that, the gas flow being discharged is distributed substantially in a width direction of the vehicle structural element and/or the vehicle.

3. The body arrangement according to claim 1, wherein the at least one guide element is constructed such that, and/or arranged on the vehicle structural element such that, the gas flow being discharged is changed into a substantially diffuse gas flow.

4. The body arrangement according to claim 1, wherein the at least one guide element extends substantially in the width direction of the vehicle structural element and/or vehicle.

5. The body arrangement according to claim 1, wherein the at least one guide element is a guiding metal sheet and/or angular metal sheet the cross section is substantially U-shaped or V-shaped.

6. The body arrangement according to claim 1, wherein the at least one guide element is of a temperature-resistant material.

7. The body arrangement according to claim 6, wherein the temperature resistant material is steel, ceramic material and/or a fiber composite material.

8. The body arrangement according to claim 1, wherein the at least one guide element is arranged below the vehicle structural element and/or is securely connected to the vehicle structural element.

9. The body arrangement according to claim 1, wherein the vehicle structural element is a vehicle body and/or a body component.

10. The body arrangement according to claim 9, wherein the vehicle structural element is a metal base sheet of a vehicle body.

11. The body arrangement according to claim 9, further comprising:

the energy storage housing, wherein the energy storage housing is arranged below the vehicle structural element and/or is securely connected to the vehicle structural element.

12. The body arrangement according to claim 11, wherein the energy storage housing is securely connected to the vehicle structural element by screws, rivets or welds.

* * * * *